United States Patent
Bezryadin et al.

(10) Patent No.: US 12,131,867 B2
(45) Date of Patent: Oct. 29, 2024

(54) DIELECTRIC NANOLAYER CAPACITOR AND METHOD OF CHARGING A DIELECTRIC NANOLAYER CAPACITOR

(71) Applicant: The Board of Trustees of the University of Illinois, Urbana, IL (US)

(72) Inventors: Alexey Bezryadin, Urbana, IL (US); Eduard Ilin, Champaign, IL (US); Irina Burkova, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 421 days.

(21) Appl. No.: 17/375,251

(22) Filed: Jul. 14, 2021

(65) Prior Publication Data

US 2022/0351902 A1 Nov. 3, 2022

Related U.S. Application Data

(60) Provisional application No. 63/054,003, filed on Jul. 20, 2020.

(51) Int. Cl.
*H01G 4/06* (2006.01)
*H02J 7/00* (2006.01)
(Continued)

(52) U.S. Cl.
CPC .......... *H01G 4/06* (2013.01); *H02J 7/007182* (2020.01); *H02J 7/345* (2013.01); *B82Y 30/00* (2013.01)

(58) Field of Classification Search
CPC ................................................ H02J 7/007128
(Continued)

(56) References Cited

U.S. PATENT DOCUMENTS 7,126,810 B1  10/2006  Mueller et al.
9,218,906 B1 *  12/2015  Hübler ..................... H01G 4/38
(Continued)

FOREIGN PATENT DOCUMENTS

CN      102709052    10/2012
ES      2763499 A1   5/2020

OTHER PUBLICATIONS

Acharya et al., "Probing the Dielectric Properties of Ultrathin Al/Al2O3/Al Trilayers Fabricated Using in Situ Sputtering and Atomic Layer Deposition," ACS Appl. Mater. Interfaces, 10 (2018) pp. 3112-3120.
(Continued)

*Primary Examiner* — Yalkew Fantu
(74) *Attorney, Agent, or Firm* — Crowell & Moring LLP

(57) ABSTRACT

A dielectric nanolayer capacitor comprises a nanoscale dielectric layer between a cathode layer and an anode layer. When exposed to a high electric field of at least about 0.5 GV/m at a temperature of about 200 K or less, the nanoscale dielectric layer includes an amount of trapped charge sufficient to form a Coulomb barrier for suppressing leakage current. A method of charging a dielectric nanolayer capacitor includes cooling a nanolayer capacitor comprising a nanoscale dielectric layer between a cathode layer and an anode layer to a temperature of about 200 K or less, and applying a high electric field of at least about 0.5 GV/m to the nanolayer capacitor to inject electrons into the nanoscale dielectric layer. While the nanolayer capacitor remains cooled to the temperature, the electrons are trapped in the nanoscale dielectric layer and form a Coulomb barrier to suppress leakage current.

20 Claims, 7 Drawing Sheets

(51) Int. Cl.
*H02J 7/34* (2006.01)
*B82Y 30/00* (2011.01)

(58) Field of Classification Search
USPC .................................................. 320/166
See application file for complete search history.

(56) References Cited

U.S. PATENT DOCUMENTS

| | | | | |
|---|---|---|---|---|
| 9,360,509 | B2 | 6/2016 | Naughton et al. | |
| 10,395,841 | B2 | 8/2019 | Lazarev et al. | |
| 2015/0077066 | A1* | 3/2015 | Stuart | H01G 4/06 361/301.4 |
| 2015/0131198 | A1* | 5/2015 | Carver | H01G 4/14 156/273.9 |
| 2017/0069426 | A1* | 3/2017 | Hübler | H01G 4/38 |

OTHER PUBLICATIONS

Banerjee et al., "Nanotubular metal-insulator-metal capacitor arrays for energy storage," Nat. Nanotechnol. 4 (2009) pp. 292-296.
Banergee et al., "ALD based Metal-insulator-metal (MIM) Nanocapacitors for Energy Storage," ECS Trans. 25 (4) (2009) pp. 345-353.
Beebe et al., "Transition from Direct Tunneling to Field Emission in Metal-Molecule-Metal Junctions," Phys. Rev. Lett., 97 (2006) pp. 026801-1-026801-4.
Belkin et al., "Recovery of alumina nanocapacitors after high voltage breakdown," Scientific Reports, 7, 932 (2017), pp. 1-7.
Belkin et al. "Reversed Photoeffect in Transparent Graphene Nanocapacitors," ACS Appl. Electron. Mater., 1 (2019). pp. 2671-2677.
Bezryadin et al., "Large energy storage efficiency of the dielectric layer of graphene nanocapacitors," Nanotechnology, 28, 495401 (2017) pp. 1-10.
Burstein et al., Photo-induced tunnel currents in Al—$Al_2O_3$—Au structures, Phys. Rev. B, 12, 8 (1975), pp. 3453-3457.
Chiang et al., "Electronic Conduction Mechanisms in Insulators," IEEE Trans. Electron Devices, 65, 1 (2018), pp. 223-230.
Chiu, "Current Conduction Mechanisms in $Pr_2O_3$/Oxynitride Laminated Gate Dielectrics," J. Appl. Phys., 105 (2009) pp. 074103-1 to 074103-4.
Chiu, "A Review on Conduction Mechanisms in Dielectric Films," Adv. Mater. Sci. Eng., 578168 (2014), pp. 1-19.
Chu et al., "Opportunities and Challenges for a Sustainable Energy Future," Nature, 488 (2012), pp. 294-303.
Correia et al. "A Lead-Free and High-Energy Density Ceramic for Energy Storage Applications," Journal of the American Ceramic Society, 96, 9 (2013), pp. 2699-2702.
Ding et al., "High-Performance MIM Capacitor Using ALD high-K $HfO_2$—Al2O3 Laminate Dielectrics," IEEE Electron Device Letters, 24, 12 (2003), pp. 730-732.
Etinger-Geller et al., "Thickness Dependence of the Physical Properties of Atomic-Layer Deposited $Al_2O_3$," J. Appl. Phys., 125 (2019) pp. 185302-1-185302-6.
Gorham et al., "Density Dependence of the Room Temperature Thermal Conductivity of Atomic Layer Deposition grown Amorphous Alumina ($Al_2O_3$)," Appl. Phys. Lett., 104 (2014), pp. 253107-1-253107-4.
Groner et al. "Electrical Characterization of Thin $Al_2O_3$ Films Grown by Atomic Layer Deposition on Silicon and Various Metal Substrates," Thin Solid Films, 413 (2002) pp. 186-197.
Groner et al., "Low-temperature $Al_2O_3$ Atomic Layer Deposition," Chem. Mater., 16 (2004), pp. 639-645.
Gupta et al., "Analysis of Dielectric Absorption in Capacitors," Journal of Academia and Industrial Research, 3, 6 (2014) pp. 255-257.
Haspert et al., "Nanoengineering Strategies for Metal-Insulator-Metal Electrostatic Nanocapacitors," ACS Nano, 6, 4 (2012), pp. 3528-3536.

Hayden et al., "The Interaction of Oxygen with Aluminium: Mainly Ellipsometric aspects," Surf. Sci., 109 (1981), pp. 207-220.
Hillmann et al., "Application of Atomic Layer Deposited $Al_2O_3$ as Charge Injection Layer for High-Permittivity Dielectrics," Semicond. Sci. Technol., 30, 024012 (2015), pp. 1-8.
Hou et al., "Ultrahigh Energy Density in $SrTiO_3$ Film Capacitors," ACS Appl. Mater. Interfaces, 9 (2017), pp. 20484-20490.
Hu et al., "Self-Repairing Characteristics in the Solid-State $Al_2O_3$ Film Capacitors," Appl. Phys. Lett., 105, (2014), pp. 033902-1 to 033902-4.
Ionescu et al., "Tunnel Field-Effect Transistors as Energy-Efficient Electronic Switches," Nature, 479 (2011), pp. 329-337.
Jegert et al., "Modeling of Leakage Currents in High-K Dielectrics: Three-Dimensional Approach Via Kinetic Monte Carlo," Appl. Phys. Lett., 96, (2010) pp. 062113 to 062113-3.
Jeurgens, et al., "Growth Kinetics and Mechanisms of Aluminum-Oxide Films Formed by Thermal Oxidation of Aluminum," Journal of Applied Physics, 92 (2002), pp. 1649-1656.
Jonscher, "Dielectric Relaxation in Solids," Journal of Physics D: Applied Physics, 32 (1999), pp. R57-R70.
Kansara et al., "Theoretical Investigation of Metallic Nanolayers for Charge-Storage Applications," ACS Appl. Energy Mater., 1 (2018), pp. 3428-3433.
Koda et al., "Low Leakage Current $Al_2O_3$ Metal-Insulator-Metal Capacitors Formed by Atomic Layer Deposition at Optimized Process Temperature and O2 Post Deposition Annealing," ECS Trans., 72 (2016), pp. 91-100.
Kuenen et al., "Measurement of Dielectric Absorption of Capacitors and Analysis of its Effects on VCO's," IEEE Trans. Instrum. Meas., 45, 1 (1996), pp. 89-97.
Lee et al., Individually Addressable Epitaxial Ferroelectric Nanocapacitor Arrays with Near Tb Inch$^{-2}$ Density, Nat. Nanotechnol. 3, (2008), pp. 402-407.
Lin et al., "Leakage Current and Breakdown Electric Field Studies on Ultrathin Atomic-Layer Deposited $Al_2O_3$ on GaAs," Appl. Phys. Lett., 87 (2005), pp. 182904-1 to 182904-3.
Lowell, "Tunnelling Between Metals and Insulators and its Role in Contact Electrification," J. Phys. D: Appl. Phys., 12 (1979) pp. 1541-1554.
Lyon et al., "Gap size Dependence of the Dielectric Strength in Nano Vacuum Gaps," IEEE Trans. Dielectr. Electr. Insul., 20, 4 (2013), pp. 1467-1471.
Matsumoto et al., "Switching Characteristics of a Thin Film SOI Power MOSFET," Jpn. J. Appl. Phys., 34 (1995), pp. 817-821.
Nguyen et al., "Relaxor-Ferroelectric Thin Film Heterostructure with Large Imprint for High Energy-Storage Performance at Low Operating Voltage," Energy Storage Mater., 25 (2020), pp. 193-201.
Palneedi et al., "High-Performance Dielectric Ceramic Films for Energy Storage Capacitors: Progress and Outlook," Adv. Funct. Mater. 28, 42 (2018), pp. 1-67.
Pan et al., "Simultaneously Enhanced Discharge Energy Density and Efficiency in Nanocomposite Film Capacitors Utilizing Two-Dimensional $NaNbO_3$@$Al_2O_3$ Platelets," Nanoscale, 11 (2019), pp. 10546-10554.
Ranjith et al., "DC Leakage Behavior and Conduction Mechanism in ($BiFeO_3$)m($SrTiO_3$)m Superlattices," Appl. Phys. Lett., 92 (2008), pp. 232905-1-232905-3.
Shukla, et al., "A Steep-Slope Transistor Based on Abrupt Electronic Phase Transition," Nat. Commun., 6, 7812 (2015), 1-6 pp.
Sire et al., "Statistics of Electrical Breakdown Field in $HfO_2$ and $SiO_2$ Films from Millimeter to Nanometer Length Scales," Appl. Phys. Lett., 91 (2007), 242905-1-242905-3.
Slenes et al., Pulse Power Capability of High Energy Density Capacitors Based on a New Dielectric Material, IEEE Transactions on Magnetics, 37, 1 (2001), pp. 324-327.
Son et al., "NiO Resistive Random Access Memory Nanocapacitor Array on Graphene," ACS Nano, 4, 5 (2010), pp. 2655-2658.
Spahr et al., "Regimes of Leakage Current in ALD-processed $Al_2O_3$ Thin-Film Layers," J. Phys. D: Appl. Phys., 46, 155302 (2013), pp. 1-6.
Specht et al., "Transport Mechanisms in Atomic-Layer-Deposited $Al_2O_3$ Dielectrics," Appl. Phys. Lett., 84 (2014), pp. 3076-3078.

(56) References Cited

OTHER PUBLICATIONS

Stengel et al., "Origin of the Dielectric Dead Layer in Nanoscale Capacitors," Nature, 443, 12 (2006), pp. 679-682.

Teverovsky, "Absorption Voltages and Insulation Resistance in Ceramic Capacitors with Cracks," IEEE Trans. Dielectr. Electr. Insul., 21 (2014), pp. 2020-2027.

Ur-Rehman et al., "Yttrium Incorporated $BiFeO_3$ Nanostructures Growth on Two Step Anodized $Al_2O_3$ Porous Template for Energy Storage Applications," Ceram. Int., 46 (2020), pp. 7681-7686.

Vogel, "Technology and metrology of new electronic materials and devices," Nat. Nanotechnol., 2 (2007), pp. 25-32.

Wei et al., "Low-Cost and High-Productivity Three Dimensional Nanocapacitors Based on Stand-Up ZnO Nanowires for Energy Storage," Nanoscale Res. Lett., 11, 213 (2016), pp. 1-9.

Weiler et al. "Kinetic Monte Carlo of Transport Processes in Al/AlOx/Au-layers: Impact of Defects," AIP Adv., 6, 095112 (2016), 1-12 pp.

Wintle, "Absorption Current, Dielectric Constant, and Dielectric Loss by the Tunnelling Mechanism," J. Appl. Phys., 44, 2514 (1973), pp. 2514-2519.

Yao et al., "Nonlinear Dielectric Thin Films for High-Power Electric Storage with Energy Density Comparable with Electrochemical Eupercapacitors," IEEE Trans. Ultrason., Ferroelectrics, Freq. Cont., 58, 9 (2011), pp. 1968-1974.

Yao et al., Enhanced Self-repairing Capability of Sol-Gel Derived $SrTiO_3$/nano $Al_2O_3$ Composite Films,: Appl. Phys. Lett., 109 (2016), pp. 092904-1-092904-5.

Zhao et al., "The Role of Nanomaterials in Redox-Based Supercapcitors for Next Generation Energy Storage Devices," Nanoscale, 3 (2011), pp. 1-45.

Zhao et al., "Current Rectifying and Resistive Switching in High Density $BiFeO_3$ Nanocapcitor Arrays on Nb—$SrTiO_3$ Substrates," Scientific Reports, 5, 9680 (2015), pp. 1-7.

\* cited by examiner

DIELECTRIC NANOLAYER CAPACITOR AND METHOD OF CHARGING A DIELECTRIC NANOLAYER CAPACITOR

RELATED APPLICATION

The present patent document claims the benefit of priority under 35 U.S.C 119(e) to U.S. Provisional Patent Application No. 63/054,003, which was filed on Jul. 20, 2020, and is hereby incorporated by reference in its entirety.

GOVERNMENT LICENSE RIGHTS

This invention was made with government support under contract no. AF FA9453-18-1-0004 awarded by the Air Force Research Laboratory of the U.S. Air Force. The government has certain rights in the invention.

TECHNICAL FIELD

The present disclosure is related generally to dielectric capacitors and more particularly to a method of charging a dielectric nanolayer capacitor.

BACKGROUND

The energy storage problem is of great importance now since the continuous usage of traditional energy carriers leads to their depletion. The environmental burden of fossil fuel utilization is also very significant. Many alternative methods of energy generation have highly varied production rates, e.g., changing from maximum generation capacity to zero within twelve hours in case of solar energy. Such methods of energy generation become economically viable only if sufficiently efficient methods of storing the energy can be found. Existing rechargeable batteries are based largely on ionic effects, and by their nature have severe limitations on physically implementable charging/discharging rates, as well as increasing production costs, since rare and difficult to process chemical elements are used in advanced batteries. Creation of an all-electronic energy storage mechanism could provide a valuable alternative. However, the only known mechanism of energy storage based on electrons is the traditional capacitor, made of two metallic plates separated by a dielectric. There are two limiting factors in such systems, namely the dielectric strength and the leakage, which, taken together, greatly restrict the possibility of employing capacitors as a replacement for common electrochemical energy storage systems.

BRIEF SUMMARY

A dielectric nanolayer capacitor comprises a nanoscale dielectric layer between a cathode layer and an anode layer. When exposed to a high electric field of at least about 0.5 GV/m at a temperature of about 200 K or less, the nanoscale dielectric layer includes an amount of trapped charge sufficient to form a Coulomb barrier for suppressing leakage current.

A method of charging a dielectric nanolayer capacitor includes cooling a nanolayer capacitor comprising a nanoscale dielectric layer between a cathode layer and an anode layer to a temperature of about 200 K or less, and applying a high electric field of at least about 0.5 GV/m to the nanolayer capacitor to inject electrons into the nanoscale dielectric layer. While the nanolayer capacitor remains cooled to the temperature, the electrons are trapped in the nanoscale dielectric layer and form a Coulomb barrier to suppress leakage current.

DETAILED DESCRIPTION

It is recognized that electronic capacitors have potential as energy storage devices. Of particular interest in this disclosure is exploiting the increase in energy density that may result from reducing the spacing between the capacitor plates down to the nanometer scale. In such nanolayer capacitors, in which the thickness of the dielectric layer is on the order of a few nanometers, the dielectric strength may increase significantly. Consequently, such nanolayer capacitors can tolerate substantially higher electric fields before a breakdown damaging to the dielectric layer ultimately occurs.

A key discovery described in this disclosure is that the nanoscale dielectric layer may be charged in such a way that the amount of charge stored inside the dielectric layer is many times higher than the charge accumulated on the capacitor plates (the anode and cathode layers). It is found that electrons can be effectively injected into the nanoscale dielectric layer using the field emission effect. The injected electrons become trapped in the nanoscale dielectric layer and may remain trapped if the temperature is sufficiently low, even if the capacitor plates are short-circuited. Such a strongly charged dielectric layer may generate a Coulomb barrier that leads to a suppression of leakage current. If the temperature is increased to the point when the electrons begin to diffuse through the nanoscale dielectric layer, the trapped charge may be released to the plates of the capacitor and a battery action may be observed. The successful charge storage in the dielectric layer may be enabled by an asymmetric electronic density distribution, as discussed below, which may be created by means of the field emission effect. Remarkably, the energy stored in the nanoscale dielectric layer can up to about eight times greater than the charge stored on the plates of the capacitor. In addition, the nanolayer capacitors described in this disclosure may exhibit excellent thermal stability, as their capacitance does not change substantially with temperature.

Figure 1:
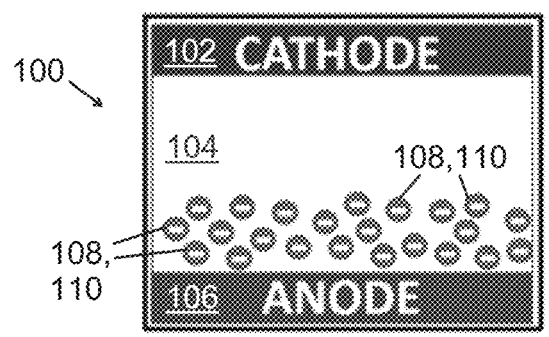
FIG. 1 is a schematic of a dielectric nanolayer capacitor including a cathode layer, a nanoscale dielectric layer, and an anode layer after undergoing charging as described in this disclosure.

A dielectric nanolayer capacitor 100 includes, as shown schematically in FIG. 1, a nanoscale dielectric layer 104 sandwiched between a cathode layer 102 and an anode layer 106, which may be referred to as capacitor plates. The nanolayer capacitor 100 of FIG. 1 is illustrated in a charged state, where trapped electrons 108 lie closer to the anode layer 106 than the cathode layer 102, as described below.

Figure 2A:
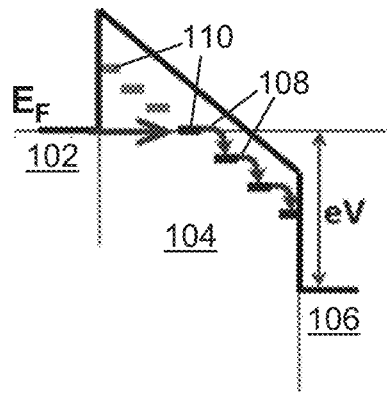
FIG. 2A is a schematic illustrating charge injection into the nanoscale dielectric layer via the field emission effect for a charging voltage greater than or equal to a threshold voltage.
Figure 2B:
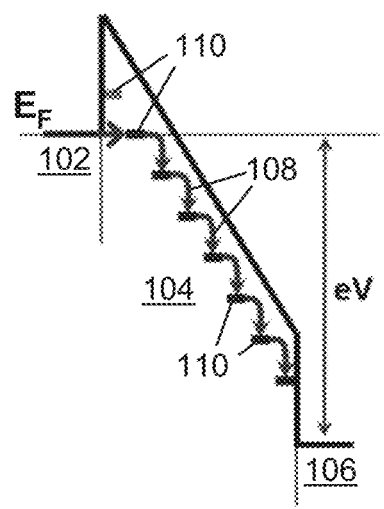
FIG. 2B is a schematic illustrating charge injection into the nanoscale dielectric layer for a higher charging voltage than employed in FIG. 2A.

A method of charging the nanolayer capacitor 100 includes cooling the nanolayer capacitor 100 to a temperature ("charging temperature") of about 200 K or less. In some examples, the charging temperature may be about 100K or less. Referring now to FIGS. 2A and 2B, a high electric field ($E_F$) of at least about 0.5 GV/m is applied to the nanolayer capacitor 100 while at the charging temperature to inject electrons 108 into the nanoscale dielectric layer 104. By biasing the nanolayer capacitor 100 to a sufficiently high voltage, a field emission effect occurs and the electrons 108 can tunnel into the nanoscale dielectric layer 104, where the dashed lines represent trapping sites 110. The left capacitor plate in FIGS. 2A and 2B is the negatively charged cathode layer 102, and from there the electrons 108 penetrate into the dielectric layer 104.

Figure 2C:
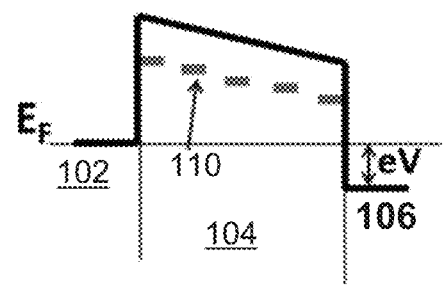
FIG. 2C is a schematic illustrating the absence of field emission and charge injection when the charging voltage is less than the threshold voltage.

Applying the high electric field may comprise applying a charging voltage to the nanolayer capacitor greater than or equal to a threshold voltage $V_{th}$ for field emission tunneling into the nanoscale dielectric layer 104. FIG. 2A shows a charging voltage $V \geq V_{th}$, and FIG. 2B shows a higher charging voltage, e.g., $V > V_{th}$. FIG. 2C shows a situation where the charging voltage V is less than the threshold voltage $V_{th}$, and no field emission effect or electron tunneling occurs. The charging voltage (V) is typically no higher than 120% of the threshold voltage $V_{th}$, as explained below, and is of course lower than a breakdown voltage of the nanolayer capacitor 100. In some examples, such as for the dielectric nanolayer capacitors 100 described in the examples below, the charging voltage may be about 6 V or less, such as from about 4.7 V to about 5.1 V.

Most or all of the electrons 108 remain trapped in the nanoscale dielectric layer 104 at low (e.g., cryogenic) temperatures, since the thermal fluctuations are insufficient for the electrons to escape from the trapping sites 110. Accordingly, while the nanolayer capacitor 100 remains cooled to the charging temperature (e.g., 200 K or less, or 100 K or less), the electrons 108 are trapped in the nanoscale dielectric layer 104 and form a Coulomb barrier to suppress leakage current. For example, at V=4.6 V (FIG. 5, inset) the leakage current drops from 400 pA before charging to less than 10 pA after the charging. Thus, the decrease is more than by factor 40. Another sample showed a decrease by more than factor 200. Even upon short-circuiting of the nanolayer capacitor 100, the electrons 108 cannot escape the trapping sites 110 if the nanolayer capacitor 100 is kept at the charging temperature.

Figure 3:
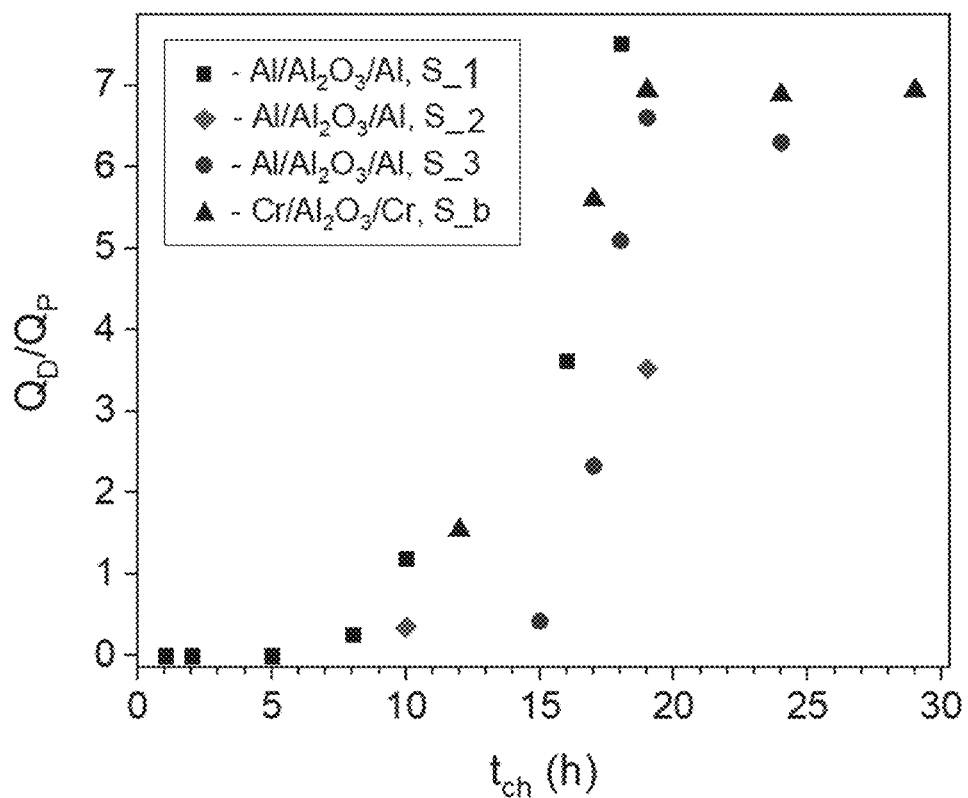
FIG. 3 shows normalized trapped charge (charge stored in the dielectric layer) versus the time over which the charging voltage is applied.

It is found that the charge $Q_D$ stored in the nanoscale dielectric layer 104 via trapping of electrons 108 greatly exceeds the charge $Q_P$ stored on the cathode and anode layers 102,106 (the capacitor plates). The ratio $Q_D/Q_P$ may be as high as about 8 and is typically at least about 3.5, or at least about 5, as illustrated in FIG. 3. In some examples, the ratio $Q_D/Q_P$ falls within the range from about 6.5 to about 7.5. The total charge stored in the nanolayer capacitor 100 may correspond to an energy density of at least about 350 J·cm$^{-3}$, at least about 450 J·cm$^{-3}$, or at least about 520 J·cm$^{-3}$, as discussed below.

The electrons 108 that penetrate into the nanoscale dielectric layer 104 under the high electric field may form a pile near the anode layer 106, as illustrated in FIG. 1. A majority if not all of the electrons 108 are trapped closer to the anode layer 106 than to the cathode layer 102, because the tunneling effect energy has to be conserved. At voltages just slightly higher than the threshold voltage $V_{th}$ at which the field emission leakage current through the capacitor 100 begins, the electrons 108 tunnel into the region having the lowest trap energy, which is the region adjacent to the anode layer 106. Thus, the field emission effect may produce a strongly nonuniform distribution, where more charges are injected into the region near the anode layer 106 than the region near the cathode layer 102, which includes traps 110 of higher energy. The resulting trapped charge distribution may be nonuniform with a progressively larger concentration of trapped electrons 108 closer to the anode layer 106.

If the charging voltage more significantly exceeds $V_{th}$, as illustrated for example in FIG. 2B, electrons 108 tunneling from the cathode layer 102 can access traps 110 with higher energy, that is, those near the cathode layer 102. This leads to a more homogeneous charge distribution in the dielectric layer 104. As a result, the difference between the numbers of electrons 108 freed from traps 110 closer to the anode layer 106 and from those closer to the cathode layer 102 upon heating the nanolayer capacitor 100 is reduced. For a certain value of the charging voltage, the charge reaching both electrodes 102,106 upon the thermal discharge becomes identical and a discharge current is no longer observed. Accordingly, the charging voltage is typically no higher than 120% of the threshold voltage $V_{th}$, to achieve the desired nonuniform charge distribution.

It is recognized that electron tunneling is an exponentially slow phenomenon. Thus, application of the high electric field over an extended time duration can be expected to fill more charge traps. Indeed, experiments show that the trapped charge $Q_D$ can be increased if charging time is increased, as shown in FIG. 3, which shows normalized trapped charge (charge stored in the nanoscale dielectric layer) versus the time over which the charging voltage is applied. There is an increase of $Q_D$ as the time is increased up to about 10-20 hours. Accordingly, the high electric field may be applied for a time duration of about at least about 10 hours, at least about 15 hours, or at least about 17 hours, and/or up to about 20 hours, or up to about 30 hours.

The electrons trapped in the nanoscale dielectric layer may be released upon warming the nanolayer capacitor to a discharge temperature of greater than about 225 K, such as at least about 290 K.

Also described in this disclosure, in addition to a charging method, is a dielectric nanolayer capacitor 100 that includes a nanoscale dielectric layer 104 positioned between a cathode layer 102 and an anode layer 106, as illustrated in FIG. 1. Upon exposure to a high electric field of at least about 0.5 GV/m at a temperature of about 200 K or less, as in the charging method described above, the nanoscale dielectric layer 104 includes an amount of trapped charge (trapped electrons 108) sufficient to form a Coulomb barrier for suppressing leakage current. The leakage current may be suppressed to lie within the range from 0 A to about $10^{-11}$ A or less.

Each of the cathode layer 102 and the anode layer 106 may comprise one or more metals such as aluminum, chromium, nickel, tantalum, silver, palladium, platinum, titanium, manganese, and/or rhodium. The nanoscale dielectric layer 104 may comprise a dielectric material such as aluminum oxide, hafnium oxide, zirconium oxide, silicon oxide, magnesium oxide, tantalum oxide, titanium oxide, barium titanate, strontium titanate, polypropylene, polyethylene naphthalate, and/or polytetrafluoroethylene. For example, as in the experimental examples below, the cathode and anode layers 102,106 may comprise aluminum or chromium, and the nanoscale dielectric layer 104 may comprise aluminum oxide. The cathode, anode and nanoscale dielectric layers 102,106,104 may be formed on a substrate that is substantially devoid of contaminants. To ensure the cleanliness of the substrate, a cleaning procedure including immersion and sonication in acetone (e.g., for about 5 min), followed by immersion and sonication in isopropanol (e.g., for about 5 min), and then drying with nitrogen gas, may be applied to the substrate prior to deposition of the cathode, anode and dielectric layers 102, 106,104. The substrate may comprise glass, quartz, sapphire, polyethylene, polypropylene, and/or polytetrafluoroethylene.

Each of the cathode layer 102 and the anode layer 106 may have a thickness in the range from about 10 nm to about 50 nm, or from about 20 nm to about 30 nm. Typically, the nanoscale dielectric layer 104 has a thickness of about 30 nm or less, about 20 nm or less, or about 10 nm or less, and/or as low as about 1 nm. Preferably, the thickness of the nanoscale dielectric layer 104 has a uniformity of +/−10%, +/−1%, or less, such as down to single atomic layer precision, across the nanoscale dielectric layer 104. Each of the cathode layer 102, the anode layer 106 and the nanoscale dielectric layer 104 may be formed by atomic layer deposition or another suitable vapor deposition method.

The dielectric nanolayer capacitor 100 may have any of the characteristics described above in regard to the charging method. For example, the distribution of the trapped charge in the nanoscale dielectric layer 104 may be nonuniform, with a majority of electrons 108 being trapped closer to the anode layer 106 than to the cathode layer 102. Also or alternatively, the charge $Q_D$ stored in the nanoscale dielectric layer 104 via trapping of electrons may greatly exceed the charge $Q_P$ stored on the cathode and anode layers 102,106, as described above. The total charge stored in the dielectric nanolayer capacitor 100 may correspond to an energy density of at least about 350 J·cm$^{-3}$, at least about 450 J·cm$^{-3}$, or at least about 520 J·cm$^{-3}$. The dielectric nanolayer capacitor 100 may have applications in space exploration technology, arctic climates, quantum computing, magnetic resonance imaging, energy storage technology, and/or infrared cameras.

Experimental Examples

Nanolayer capacitors of the type Al/Al$_2$O$_3$/Al (cathode layer/dielectric layer/anode layer) have been fabricated and investigated (samples S_1, S_2, S_3). In addition to those, for comparison, w Cr/Al$_2$O$_3$/Cr capacitors (sample S_b) have been fabricated and investigated as well. The Al and Cr cathode (25 nm) and anode (25 nm) layers were produced by thermal evaporation onto a glass substrate in a vacuum of ~10$^{-5}$ Torr. The alumina (d=10 nm for samples S_1, S_2, S_3, and 9 nm for S_b) was deposited using trimethylaluminum/H$_2$O-based ALD deposition at 80° C. The surface of the sample S_1 was A=1 mm$^2$, with the capacitance C=8 nF. For samples S_2, S_3, and S_b these parameters were A=2.25 mm$^2$, 2.25 mm$^2$, 1.21 mm$^2$ and C=12 nF, 11.43 nF, 7 nF correspondingly. Measurements at cryogenic temperatures were performed using a sample-in-vacuum dipstick (~10$^{-3}$ Torr), immersed in liquid N$_2$. To shield the samples from external electromagnetic noises the samples were placed into a Faraday cage, located inside the dipstick.

Electrical measurements were performed with Keithley 6517B electrometer. The output voltage, V, of this device was applied to the capacitor through a calibrated series resistor, R$_{st}$=1 GO. The current in the circuit, I, was also measured by Keithley 6517B. The voltage on the sample (the tested capacitor), V$_S$, was computed by the formula V$_S$=V−IR$_{st}$. The "high" voltage terminal was always connected with the top plate of the capacitors, which means that the positive voltage corresponds to the positive potential on the top plate. The experiment was carried out in several successive phases: #1 charging the capacitor at T=77 K, for the time duration of t$_{ch}$, which was a few hours, at a fixed voltage on the sample V$_S$, typically a few volts; #2 discharging through a series standard resistor R$_{st}$=1 GΩ for a duration of 5 min, followed by a conformational discharging with the plates being short-circuited (without any resistor but through a copper wire) for 50 min, to further ensure that the plates of the capacitor are fully discharged; #3 warming up to room temperature, while the applied voltage was zero.

To obtain the current-voltage dependence ("I-V curve") and to measure the breakdown voltage, the voltage was applied in small discrete steps of ~0.1 V. The time delay between the voltage steps was 300 seconds for the nanolayer capacitors with 20, 25, 30, 50 and 100 nm alumina thicknesses, and 100 seconds for the 7, 10 and 15 nm alumina thickness. The time delay is needed to achieve the true equilibrium value of the current for the set voltage. The measurements of the current in the circuit were performed using Keithley 6517B. This device is equipped with an adjustable voltage source, which also provides a voltage biasing. In case of the breakdown voltage measurement, the voltage was increased step by step up to the breakdown of the capacitor, which appeared as a sharp increase of the current. The breakdown electric field is calculated as E$_{br}$=V$_{br}$/d, where V$_{br}$ is breakdown voltage, d is a dielectric thickness.

Figure 4:
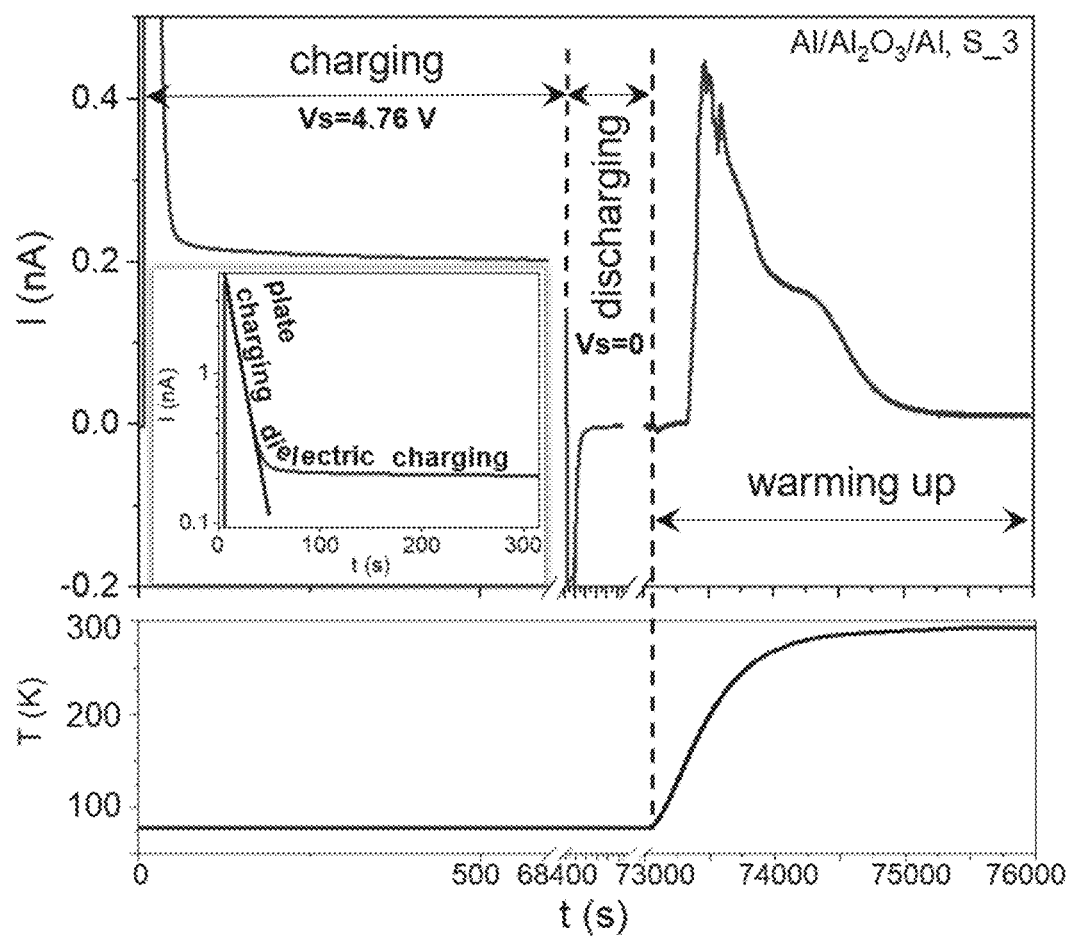
FIG. 4 shows current (top plot) and temperature (bottom plot) as functions of time at different regimes for the sample designated S_3, including charging for 19 h at 77 K, discharging for 5 min (with resistor) and an additional 50 min (with short-connected plates) at 77K, and warming up to room temperature.

A typical time dependence of the charging current for a full experimental cycle is shown in FIG. 4, top plot. The cycle observed on the curve match the experimental stages outlined above, namely: #1 charging for t$_{ch}$=19 h, at V$_S$=4.76 V, #2 discharging at T=77 K, and #3 warming up the capacitor, while the current was measured through an ammeter connected to the capacitor through a 1 GΩ resistor. Thus, in stage #1 an exponential drop of the charging current is observed, as expected for charging of a capacitor through a resistor. In stage #2 the discharge current is shown, which is negative. The key result is the current peak observed in the stage #3, in which no voltage was applied, and the detected current was due to the extra charge trapped in the dielectric, which was released by thermal fluctuations. The time dependence of the sample temperature corresponding to all three stages is shown in FIG. 4, bottom plot.

In the inset of FIG. 4, the charging current measured in the stage #1 (at temperature T=77 K) of the experimental cycle is shown. Initially, the curve shows an exponential drop of the charging current as expected for an ideal capacitor. From the slope a capacitance of $C_{77K}$=11.07 nF (the corresponding charging time was τ=11.07 s, while the series resistance was 1 GΩ) is obtained, while a measurement performed at a higher frequency (120 Hz; performed using a LCR-meter 878A) showed a slightly lower value of 10.75 nF. Notably, the room temperature capacitance was about the same value, 11.43 nF, which shows high thermal stability of these nanolayer capacitors. The key fact following from the inset of FIG. 4 is that the charging current drop slows down at long times. The charging curve exhibits a "tail," which indicates that the current flowing into the capacitor is larger than the one expected for an ideal capacitor. This is explained by the charge penetration in the dielectric layer, which is also known as soakage or dielectric absorption.

To better understand the charge storage in the nanolayer capacitor, in particular in the dielectric layer, the discharge current is integrated and the total charge exiting the capacitor is determined. The integral charge (stage #2) was $Q_P=\int I/dt \approx 51.87$ nC, which corresponds well to the charge stored on the capacitor plates estimated by the capacitor charge formula $Q_P=C_{77K}V_S$=52.36 nC. Subsequent heating of the previously discharged capacitor exhibits a much larger integral charge, which is a highly surprising result. Namely, the total charge released due to the heating of the capacitor was evaluated at $Q_D=\int I/dt \approx 346$ nC, based on the time dependence plot for the discharge I(t), as shown in FIG. 4. Here the subscript "D" represents that the charge was stored in the dielectric layer and was released during the heating stage. Note that the discharge current occurs only as the temperature reaches ~225 K. An important observation here is that the direction of the heat-induced current matches the direction of the initial charging current, as measured in stage #1.

Figure 5:
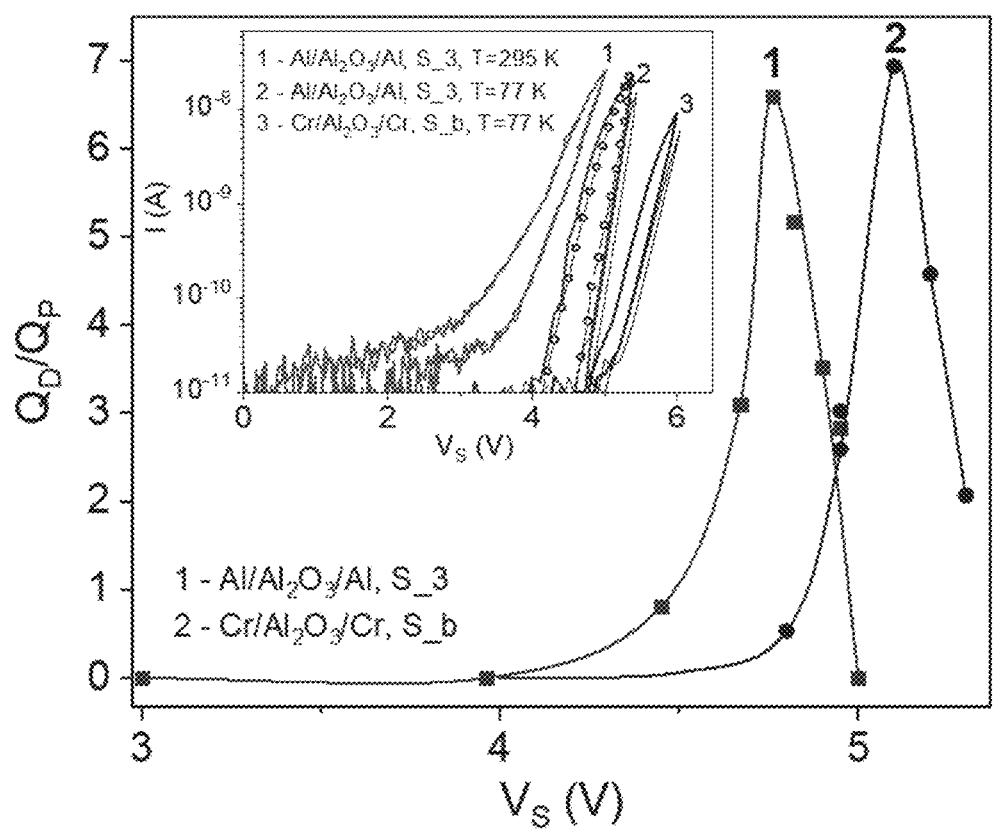
FIG. 5 shows normalized charge stored in the nanoscale dielectric layers of the Al- and Cr-based nanolayer capacitors, and the inset shows V-I curves for the two types of capacitors at different temperatures.

In FIG. 5, the total charge, $Q_D$, released during the stage #3 (warming up) is shown, normalized by the calculated charge stored on the capacitor plates in the fully charged states, $Q_P=C_{77K}V_S$, where $V_S$ is the voltage on the capacitor, corresponding to the charging cycle (stage #1). The charge stored in the dielectric, $Q_D$, is obtained, as explained above, by the integration of the current flowing out of the capacitor during the warming up (stage #3). As shown in FIG. 5, the dielectric-stored charge depends strongly on the charging voltage. At voltages $V_S$<4 V for Al/Al$_2$O$_3$/Al and $V_S$<4.7 V for Cr/Al$_2$O$_3$/Cr the stored charge is near zero. As the charging voltage is increased to the level at which the field emission leakage current becomes significant (see inset of FIG. 5), a strong increase of the stored charge $Q_D$ is observed. The normalized charge reaches its maximum value of $Q_D/Q_P$=6.6, corresponding to the charging voltage $V_S$=4.76 V for Al/Al$_2$O$_3$/Al. Thus, it is found that the charge stored in the dielectric layer can be much larger than the charge stored on the cathode and anode layers. The results on a Cr film capacitor confirmed the finding: The maximum normalized charge was $Q_D/Q_P$=6.9 (corresponding to the charging voltage $V_S$=5.1 V). Further increase of the charging voltage leads to a steep drop of the stored charge $Q_D$.

The voltage-current dependence of two typical nanolayer capacitors is shown in the inset of FIG. 5. At low temperature (T=77 K) and low voltages, the leakage current is so low that it is undetectable. Yet, at T=295 K, the leakage is visible even at low voltages, at which the field emission effect is negligible. As the voltage exceeds some threshold, $V_{th}$, the field emission current is detected and increases roughly exponentially with the voltage on the capacitor, $V_S$. At T=77 K, the V-I curves show some hysteresis, but only during the first cycle of the sweeping voltage. If the voltage is increased to the maximum and decreased to zero and then the V-I curve is measured again, then the hysteresis does not occur (at T=77 K). This may be explained by the conjecture that the electrons enter the dielectric layer in the first charge cycle, get trapped by the dielectric layer and do not move away as the voltage is reduced to zero. The circles shown in the inset of FIG. 5 correspond to a V-I curve measured after the sample was warmed up to room temperature and then cooled again to 77 K. This curve shows that the effect is reproducible, and that the charges can indeed be removed from the dielectric layer if the temperature is increased to room temperature. Additional confirmation to this conclusion comes from the T=295 K curve (curve #1 in the inset). At this high temperature, the charges cannot get trapped because the charges are mobile. This fact is clearly illustrated by the corresponding V-I curve, which exhibits a significant leakage current (e.g., >10$^{-11}$ A) even at low voltages. Correspondingly, the V-I curve always shows the same amount of hysteresis, even if the voltage is cycled many times.

An important observation to be emphasized here is that if the charging voltage of the capacitor is chosen such that it is less than $V_{th}$, then the stored charge, as shown in FIG. 5, is near zero. If the charging current is slightly larger than $V_{th}$, then the stored charge shows a maximum. If the charging voltage is significantly larger than $V_{th}$, then the stored charge drops quickly. For example, for the Al capacitor (curve 1), $V_{th}$=4 V and the maximum of the stored charge is observed at $V_S$=4.76 V. Yet, if the charging voltage is chosen $V_S$=4 V or $V_S$=5 V, then the stored charge is near zero. For the chromium-plate capacitor (curve 2), the results are similar. The threshold voltage is $V_{th}$=4.7 V. The maximum of the stored charge is observed at $V_S$=5.1 V. Notably, if the charging voltage is not sufficiently close to the maximum value, e.g., $V_S$=5 V or $V_S$=5.3 V, then the stored charge may be substantially lower, such as more than two times lower than the maximum value.

Penetration of charges into the dielectric layer occurs by means of quantum tunneling, namely the field emission. Quantum tunneling is a process which conserves energy so the charges tunnel to the regions of the dielectric which are near the anode. This is because the energy of the electronic traps located near the anode becomes equal to the Fermi energy of the electrons in the cathode, assuming the bias voltage is optimally tuned to maximize the charge storage effect.

It is also known that the tunneling phenomenon is an exponentially slow phenomenon. Thus, performing the charging procedure longer can help to fill more charge traps. Indeed, the experiments showed that the trapped charge $Q_D$ can be increased if the charging time is increased. This is illustrated in FIG. 3, which was discussed above and which shows total charge stored in the dielectric and released during the warming up phase (stage #3) plotted versus the charging time. The charging is performed at a fixed voltage, which was 4.82 V, 4.82 V, 4.76 V and 5.1 V for samples S_1, S_2, S_3, and S_b, respectively. The charge stored in the dielectric is normalized (divided) by the charge stored on the capacitor plates. There is an increase of $Q_D$ as the time is increased up to ~10-20 hours. In this respect, such nanolayer capacitors may resemble rechargeable batteries, which typically require a long time to be charged.

Also, experiments were performed to establish stability of the stored charge. The sample S_3 was charged at a voltage $V_S$=4.82 V, discharged for 5 min with the resistor and discharged for 50 min with short-circuited plates, at 77 K. Then the stored charge was measured, yielding $Q_D$=275 nC. In the subsequent experiment, all steps were the same but the discharge with shorted plates continued for 136 h. The resulting charge was $Q_D$=214 nC. This demonstrates that the charge is quite stable even if the plates are short-circuited for a long time.

Figure 6A:
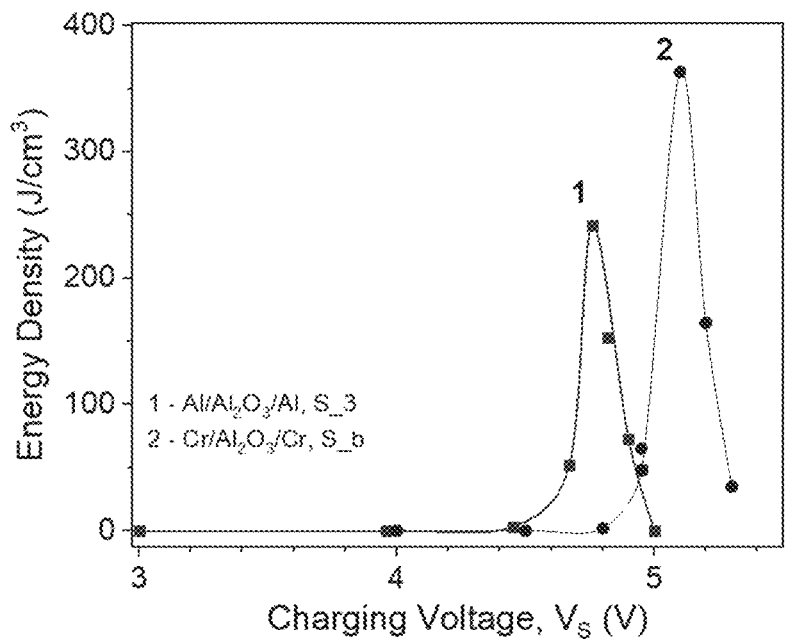
FIG. 6A shows energy density as function of charging voltage for the Al- and Cr-based nanolayer capacitors.
Figure 6B:
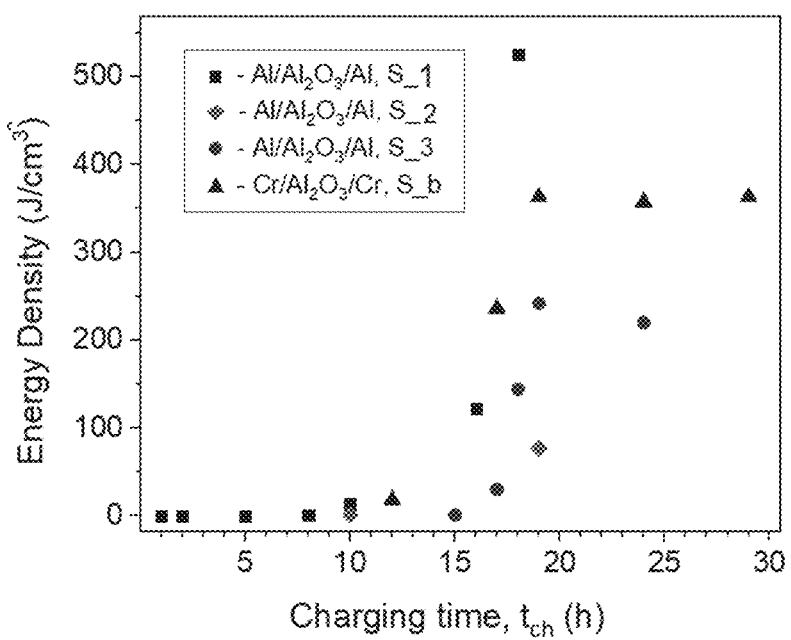
FIG. 6B shows energy density as function of charging time for the Al- and Cr-based nanolayer capacitors.

The maximum efficiency observed in the experiments was nearly 8 (specifically 7.5), meaning that the charge stored in the dielectric layer was up to 8 times higher than the charge stored in the cathode and anode layers during the charging. Also estimated is the energy density. The total energy can be calculated as $W_D = Q_D^2/2C \approx 5.2$ μJ. The volume of the dielectric layer and the mass of the dielectric layer have been evaluated using standard table values. Accordingly, in one example, the resulting energy density is w=$W_D$/(Ad)=520 J·cm$^{-3}$. The results are shown in FIGS. 6A and 6B as a function of charging voltage and charging time, respectively, for the exemplary nanolayer capacitors. An important finding is that, to achieve a high energy density, the charging voltage may need to be precisely tuned and the charging time may need to be of a sufficiently long duration. If expressed per unit mass, the energy density is ~200 J·g$^{-1}$, assuming the density of alumina is 2.6 g·cm$^{-3}$.

The observed current produced upon the heating of the nanolayer capacitor is believed to be entirely due to release of the charge previously accumulated in the dielectric layer. Furthermore, the direction of this additional current demonstrates that it cannot be attributed to dielectric polarization from hindered movement of dipoles, which is known to constitute one of the two main mechanisms of dielectric response. A discharge current from this type of polarization flows in the same direction as the conventional discharge current from the capacitor plates, i.e., in the opposite direction of the charging current. Yet, the discharge current measured with increasing temperature flows in the same direction as the charging current. The secondary discharge current may thus result from the other type of dielectric response, involving the charge accumulation due to tunneling and subsequent trapping of electrons at localized sites in the dielectric layer. This process leads to the formation of localized trapped charge in the dielectric layer, which cannot be dissipated by thermal fluctuations at cryogenic temperatures even when the applied voltage is reduced to zero.

The main factor determining the filling of localized electron traps appears to be the charging voltage. At low charging voltages, V<$V_{th}$, there is no leakage current through the capacitor, and the electron traps in the dielectric layer primarily remain unoccupied, as illustrated in FIG. 2C. Here, $V_{th}$ is the threshold voltage at which the field emission leakage current through the nanolayer capacitor begins (see inset of FIG. 5). The filling of traps starts at V>$V_{th}$, at the onset of the field emission. Note that the average energy of the charge traps located near the anode layer is lower since the electrons are attracted to the anode. At charging voltages exceeding $V_{th}$, electrons can tunnel into localized trap sites with the energy below the Fermi level, i.e., those which are located close to the anode layer, as illustrated in FIG. 2A. Thus, the field emission effect produces a strongly nonuniform distribution: More charges are injected into the region near the anode layer, while the region near the cathode layer is completely depleted of extra electrons since the electrons cannot tunnel into traps in that region, since the energy of such traps is higher. The resulting inhomogeneous trapped charge distribution in the dielectric layer may include a progressively larger concentration of trapped electrons closer to the anode layer.

If the capacitor is discharged at low temperature, a majority of trapped electrons may remain in the dielectric layer, since the thermal fluctuations are insufficient for the electrons to escape from the trapping sites. This is clear also from the fact that at low temperature the measured diffusive electronic conductivity (i.e., the conductivity occurring at low bias) is undetectable.

Figure 7:
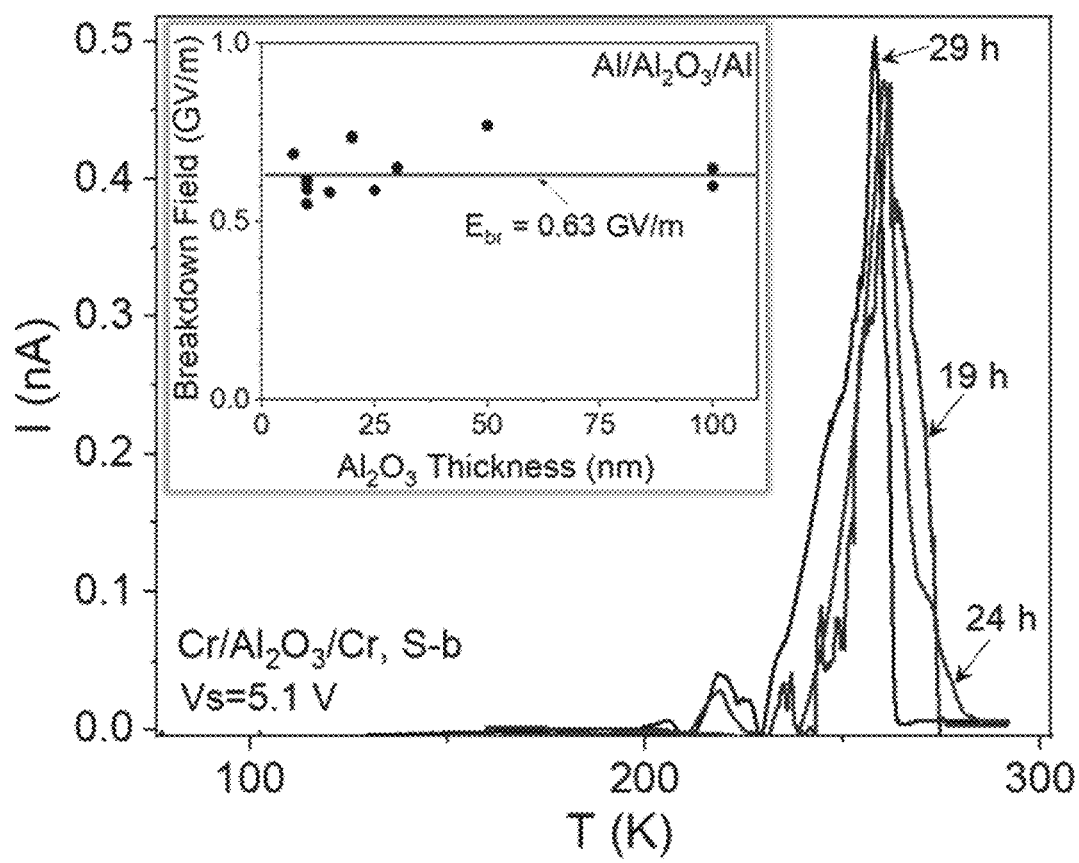
FIG. 7 shows discharge current versus temperature at zero applied voltage for Cr-based nanolayer capacitors, where the data reveal the thermal escape of electrons from their traps for different charging times; the inset shows the breakdown electric field as a function of dielectric film thickness for capacitors with Al electrodes.

When the temperature is increased in the later stage of the experiment, the energy of thermal fluctuations becomes sufficient to free electrons from the trapping sites. FIG. 7 plots discharge current versus temperature, at zero applied voltage, where the data show the thermal escape of electrons from their traps. The time (19 h, 24 h and 29 h) indicated is the charging time, while the charging voltage was $V_S$=5.1 V. The inset shows breakdown electric field (i.e., the dielectric strength) as a function of the dielectric film thickness, obtained on capacitors with Al electrodes. The dielectric strength appears independent of the film thickness at the scale between 7 nm and 100 nm. This stage of the experiment essentially represents a thermal spectroscopy analysis of electron traps: At any given temperature, the electrons leaving the dielectric layer overcome a trapping energy of the order of $k_B T$. Therefore, at a sufficiently high temperature, many electrons regain mobility and move towards the nearest electrode. Since the concentration of trapped charges was larger close to the anode, an asymmetric discharge current is observed, matching the direction of the charging current shown in FIG. 4. In this thermal escape process, the electrons diffuse to the anode layer since it is the closest electrode to a majority of them.

To confirm the fact that the electron mobility is high at room temperature compared to cryogenic temperatures, a measurement of the leakage current at T=295 K is shown in the inset of FIG. 5. In this figure, the low-voltage leakage is visible on the room temperature curve. This leakage is below the noise level at T=77 K. This fact explains the advantage of low temperatures to operate the charge storage function of the dielectric layer in the nanolayer capacitor.

If the charging voltage greatly exceeds $V_{th}$, as illustrated in FIG. 2B, electrons tunneling from the cathode layer can access traps with higher energy, i.e., those near the cathode. This leads to a more homogeneous charge distribution in the dielectric layer. As a result, the difference between the numbers of electrons freed from traps closer to the anode layer and from those closer to the cathode layer upon heating of the nanolayer capacitor is reduced. For a certain value of the charging voltage, the charge reaching both electrodes upon the thermal discharge becomes identical, and a discharge current is no longer observed.

It should be noted that the efficiency of a capacitor to store energy may be limited by its dielectric strength. Yet, it is observed (inset of FIG. 7) that the strength of the electric field at which the breakdown occurs is considerably larger than the field needed to charge the dielectric layer, and it is independent of the thickness of the dielectric layer. Thus, employing the nanolayer dielectrics that enable efficient field emission charging does not negatively impact the capacitor performance.

Figure 8A:
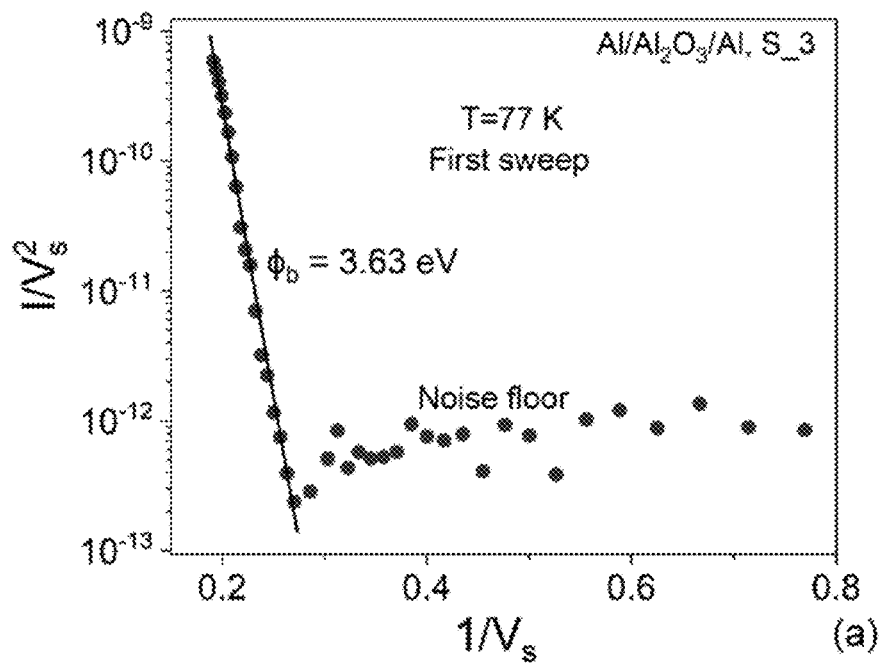
FIGS. 8A and 8B show field emission plots for the Al/Al$_2$O$_3$/Al (S_3) capacitor at 77 K from first and second voltage sweeps, respectively.
Figure 8B:
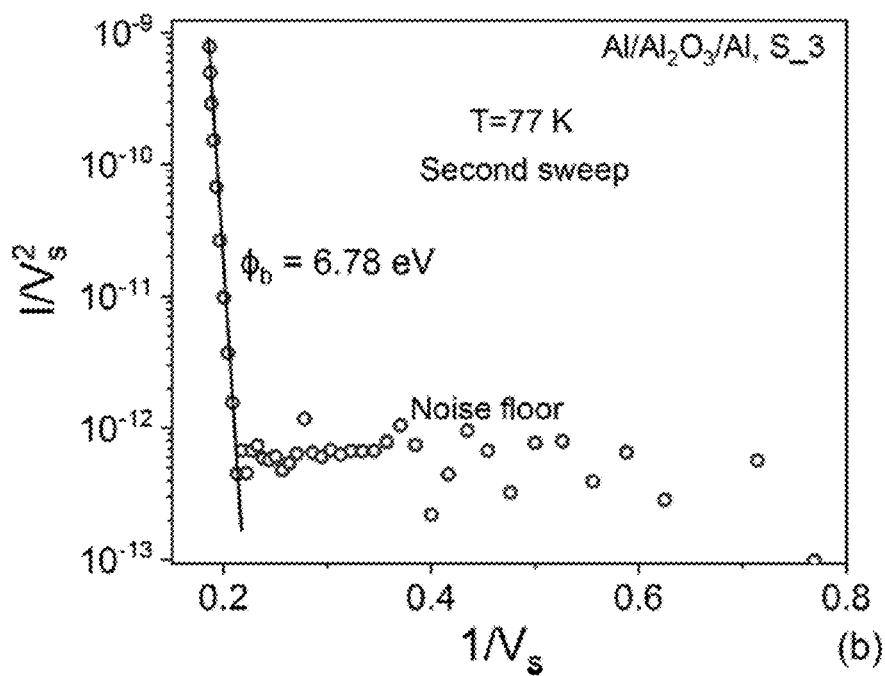

To understand the effect of field emission on the measured current, the current versus voltage dependence is analyzed. The expression for the field emission current density is: $J = e^3 E^2/(8\pi h e \phi_b) \cdot \exp[-8\pi(2em^*)^{1/2} \phi_b^{3/2}/3hE]$, where J is the current density, e is the electronic charge, h is the Planck's constant, $\phi_b$ is metal-insulator energy barrier height, m* is effective electron mass in the insulator. For the convenience of the analysis, voltage V, which is related to the electric field E as V=Ed, where d is a dielectric thickness is used. The current density J is calculated as J=I/A, where A is the area of the capacitor and I is the measured current. Then, the equation for the field emission current become: $I=e^3 AV_s^2/(8\pi hed^2 \phi_b) \cdot \exp[-8\pi(2em^*)^{1/2} d\phi_b^{3/2}/3h\ V_s]$. According to the equation, it is useful to plot the logarithm of the current divided by the voltage squared, $\ln(II\ V_s^2)$, versus the inverse voltage, $1/V_S$. FIGS. 8A and 8B show field emission plots for the Al/Al$_2$O$_3$/Al (S_3) capacitor at 77 K (the data shown in the inset of FIG. 5); $d_{oxide}$=10 nm, A=2.25 mm$^2$. In FIG. 8A, the initial dependence is shown, while FIG. 8B represents the dependence taken in the second sweep, when the dielectric layer was charged. The dependence is expected to be linear in these coordinates. The linear fits show good agreement with the data. Slopes of the best fits (black lines) provide information about the effective tunnel barrier height, $\phi_b$, for each case. The effective barrier was determined assuming that the effective mass is m*=0.05 m$_0$, the results being $\phi_b$=3.63 eV and 6.78 eV for the first and second sweeps correspondingly. Thus, the field emission effect is confirmed. It is interesting to note that in the second measurement, the barrier height is almost twice as large. This may be understood to be evidence confirming the trapping of additional charges in the dielectric layer.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A method of charging a dielectric nanolayer capacitor, the method comprising:
    cooling a nanolayer capacitor to a charging temperature of 200 K or less, the nanolayer capacitor comprising a nanoscale dielectric layer between a cathode layer and an anode layer;
    during the cooling, applying a high electric field of at least about 0.5 GV/m to the nanolayer capacitor to inject electrons into the nanoscale dielectric layer,
    wherein applying the high electric field comprises applying a charging voltage greater than or equal to a threshold voltage Vin for field emission tunneling into the nanoscale dielectric layer, and
    wherein, while the nanolayer capacitor remains cooled to the charging temperature, the electrons are trapped in the nanoscale dielectric layer and form a Coulomb barrier to suppress leakage current.

2. The method of claim 1, wherein a ratio $Q_D/Q_P$ is at least about 3.5 and as high as about 8, where $Q_P$ represents an amount of charge stored in the nanoscale dielectric layer via trapping of the electrons, and $Q_P$ represents an amount of charge stored on the cathode layer and the anode layer.

3. The method of claim 1, wherein a distribution of the electrons in the nanoscale dielectric layer is nonuniform, a majority of the electrons being trapped closer to the anode layer than to the cathode layer.

4. The method of claim 1, wherein the high electric field is applied for a time duration of about at least about 10 hours.

5. The method of claim 1, wherein the dielectric capacitor exhibits an energy density of at least about 350 J·cm$^{-3}$.

6. The method of claim 1, wherein, upon short circuiting the nanolayer capacitor, the electrons remain trapped while the nanolayer remains at the charging temperature.

7. The method of claim 1, wherein the electrons trapped in the nanoscale dielectric layer are released upon warming the nanolayer capacitor to a discharge temperature of greater than about 225 K.

8. The method of claim 1, wherein each of the cathode layer and the anode layer comprises one or more metals selected from the group consisting of: aluminum, chromium, nickel, tantalum, silver, palladium, platinum, titanium, manganese, and rhodium, and
    wherein the nanoscale dielectric layer comprises a dielectric material selected from the group consisting of: aluminum oxide, hafnium oxide, zirconium oxide, silicon oxide, magnesium oxide, tantalum oxide, titanium oxide, barium titanate, strontium titanate, polypropylene, polyethylene naphthalate, and polytetrafluoroethylene.

9. The method of claim 1, wherein the nanolayer capacitor consists of the cathode layer, the anode layer, and the nanoscale dielectric layer, and
    wherein the cathode layer is a planar cathode layer, the anode layer is a planar anode layer, and the nanoscale dielectric layer is a planar nanoscale dielectric layer.

10. The method of claim 1, wherein the charging voltage is within 120% of the threshold voltage $V_{th}$.

11. A dielectric nanolayer capacitor comprising:
    a nanoscale dielectric layer between a cathode layer and an anode layer,
    wherein, when exposed to a high electric field of at least about 0.5 GV/m and a charging voltage greater than or equal to a threshold voltage $V_{th}$ for field emission tunneling into the nanoscale dielectric layer while at a charging temperature of 200 K or less, the nanoscale dielectric layer includes an amount of trapped charge sufficient to form a Coulomb barrier for suppressing leakage current.

12. The dielectric nanolayer capacitor of claim 11, wherein a ratio $Q_D/Q_P$ is at least about 3.5 and as high as about 8, where $Q_P$ represents the amount of trapped charge in the nanoscale dielectric layer, and $Q_P$ represents an amount of charge stored on the cathode layer and the anode layer.

13. The dielectric nanolayer capacitor of claim 11, wherein a distribution of the trapped charge in the nanoscale dielectric layer is nonuniform, a majority of electrons being trapped closer to the anode layer than to the cathode layer.

14. The dielectric nanolayer capacitor of claim 11 comprising an energy density of at least about 350 J·cm$^{-3}$.

15. The dielectric nanolayer capacitor of claim 11, wherein each of the cathode layer and the anode layer comprises one or more metals selected from the group consisting of: aluminum, chromium, nickel, tantalum, silver, palladium, platinum, titanium, manganese, and rhodium, and
    wherein the nanoscale dielectric layer comprises a dielectric material selected from the group consisting of: aluminum oxide, hafnium oxide, zirconium oxide, silicon oxide, magnesium oxide, tantalum oxide, titanium oxide, barium titanate, strontium titanate, polypropylene, polyethylene naphthalate, and polytetrafluoroethylene.

16. The dielectric nanolayer capacitor of claim 11, wherein each of the cathode layer and the anode layer has a thickness in range from about 10 nm to about 50 nm.

17. The dielectric nanolayer capacitor of claim 11, wherein the nanoscale dielectric layer has a thickness of about 30 nm or less.

18. The dielectric nanolayer capacitor of claim 11, wherein a thickness of the nanoscale dielectric layer has a uniformity of +/−10% across the nanoscale dielectric layer.

19. The dielectric nanolayer capacitor of claim 11, wherein a substrate upon which the cathode, anode, and nanoscale dielectric layers are formed is substantially devoid of contaminants.

20. The dielectric nanolayer capacitor of claim 19, wherein the substrate comprises a material selected from the group consisting of: glass, quartz, sapphire, polyethylene, polypropylene, and polytetrafluoroethylene.

* * * * *